UNITED STATES PATENT OFFICE.

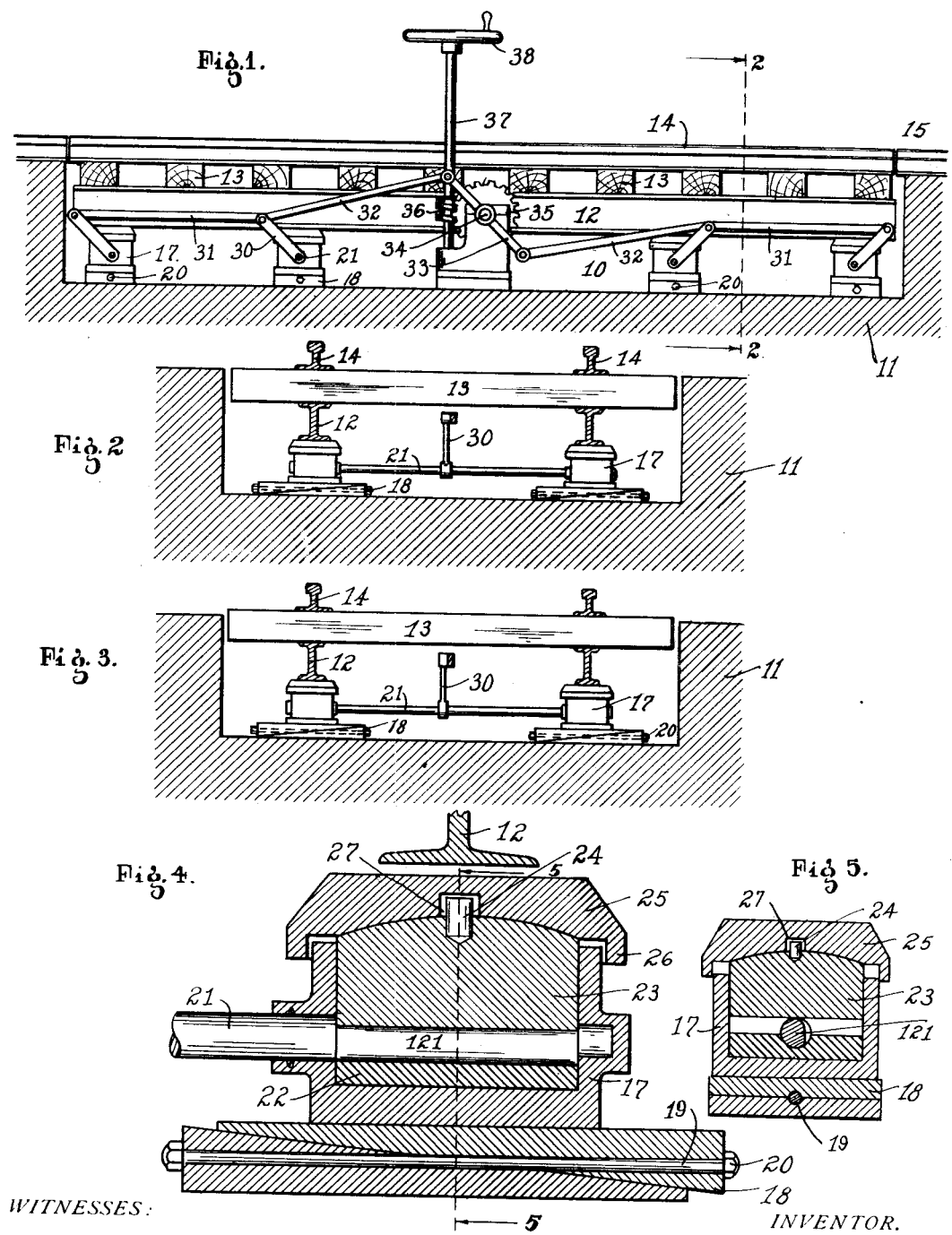

MARLON H. WINSLOW, OF TERRE HAUTE, INDIANA.

RAILWAY WEIGHING-SCALE.

1,133,901.  Specification of Letters Patent.  Patented Mar. 30, 1915.

Application filed August 14, 1913. Serial No. 784,775.

*To all whom it may concern:*

Be it known that I, MARLON H. WINSLOW, a citizen of the United States, and a resident of Terre Haute, county of Vigo, and State of Indiana, have invented a certain new and useful Railway Weighing-Scale; and I do hereby declare that the following is a full, clear, and exact description thereof, reference being had to the accompanying drawings, in which like letters refer to like parts.

The object of this invention is to provide an improved means for slidingly elevating the platform and railway track of railway weighing scales, when the scales are not in use, so as to relieve the knife edge bearings and the weighing apparatus of the weight of the platform and railway and particularly from the vibration and jar which arises when cars and locomotives are run over the railway scales while switching or for any other purpose. In other words, with this improvement cars and locomotives can switch or travel freely over the railway scales without doing them any injury and the construction of a side track around the scale for switching and other purposes, as has heretofore been the practice, will be avoided.

The chief feature of the invention consists in providing under the I-beams carrying the platform and railway scale, a number of bearing boxes having mounted in them cam shafts adapted to elevate bearing blocks vertically movable in and guided by said box and supporting caps under and carrying the I-beams. The cam shafts are connected by actuating means so that they are simultaneously operative for elevating the I-beams simultaneously at various points. Beneath the bearing blocks there is a base adjustable in vertical thickness so as to readily adjust the apparatus, as it is not desired to elevate the I-beams but very slightly off the knife edge bearings.

The general nature of the invention will be understood from the accompanying drawings and the following description and claims.

In the drawings, Figure 1 is a vertical longitudinal section through said weighing scale, the knife edge bearings and other parts of the weighing apparatus being omitted, however. Fig. 2 is a transverse section through the same on the line 2—2 of Fig. 1, showing the scale platform down on the knife edge bearings. Fig. 3 is the same as Fig. 2, showing the platform elevated. Fig. 4 is an enlarged sectional view through the bearing box and associated parts with the bearing block in its lower position. Fig. 5 is a section on the line 5—5 of Fig. 4, showing the cam shaft and other parts in their elevated position.

In detail there is shown herein a scale body 10 with concrete or other wall 11 and with I-beams 12, cross ties 13 and railway rails 14 constituting the platform and railway of the scale, said rails 14 being in alinement with the track rails 15. The knife edge bearings and other parts of the weighing apparatus are not shown, but may be of any usual type so far as this invention is concerned. Within the pit 10 at intervals under each I-beam 12 there are bearing boxes 17 closed excepting on their upper sides and supported on bases formed of two blocks 18 triangular in vertical section and arranged oppositely with reference to each other and one upon the other, as shown in Fig. 4, and having extending through longitudinal slots in them a rod 19 with a nut 20 thereon so that by tightening the rod to cause said base blocks to slide toward each other, the thickness of the base blocks will be increased for the purpose of vertically adjusting the position of the bearing boxes 17 and other parts with reference to the I-beam 12.

There are a number of transversely disposed cam shafts 21 with each end extending into the bearing box 17, the portion 121 of the cam shaft 21 which lies within said bearing box being offset to some extent to form the cam, as shown. Under the cam portion 121 in each bearing box there is a plate 22 in position to be engaged by and support the cam portion of the cam shaft when the cam portion is in its lower position. The bearing block 23 rests upon the cam portion 121 of the cam shaft and lies within and is guided by the walls of the box 17 so that when the cam shaft is given about a fourth revolution, it will elevate said block 23 to the position shown in Fig. 5. The upper surface of the block 23 is convex and has in it a centrally located upwardly extending pin 24, said pin and the upper surface lying at all times somewhat upon the margin of the box 17.

A cap 25, concave on its under side, rests upon the top of the bearing block 23 and has downwardly extending lateral flanges 26 overlapping the upper edges of the box 17 and it also has a central recess 27 into which the pin 24 projects. This arrangement is to prevent the lateral dislocation of the cap 25. Normally the I-beam 12 does not rest upon the cap 25, but it is supported by the knife edge bearings, not shown, slightly above the cap 25 when it is in its lower position, as shown in Fig. 4. But when the cap is elevated to the cam shaft, it will be moved up to and against the I-beam and still further be elevated so as to elevate the I-beam a slight distance from said knife edge bearings.

The cam shafts are all similarly operated by a number of crank arms 30 secured to the shafts 21 and extending upwardly therefrom and connected with each other by links 31 and the crank arms 30 nearest the middle of the scale are connected by links 32 with a bar 33 secured to a shaft 34 mounted in bearings 35. Said bars 33 extend in opposite directions diametrically from the shaft 34 and the links 32 on one side are connected to one side of said bar 33 and the links on the other side are connected with the other end of the bar 33. Said shaft 34 is oscillated by a gear wheel 35 which may be actuated by any suitable means, that here shown being a worm 36 meshing with said wheel 35 and being secured on a shaft 37 vertically disposed in the frame work of the scale and having a hand wheel 38 secured to the upper end of said shaft for oscillating the same. When said wheel 38 is oscillated in one direction it will turn the bar 33 from the position shown in Fig. 1, about ninety degrees which will give the desired movement of the cam shafts in their relation to the bearing blocks 23.

This construction is readily adjustable, is economical in erection and is extremely strong and durable while supporting the platform and railway of the scale when not in use for weighing purposes, but when used for side tracking or other purposes. At that time the means for supporting the platform is subject to great strain and vibration and the means here shown by reason of the character of the construction thereof will sufficiently withstand the work put upon it.

The invention is:

1. A railway weighing scale including a platform, a number of bearing boxes located beneath the platform, cam shafts mounted in said bearing boxes having cam portions located within said boxes, a bearing block located in and guided by said boxes and having convex upper surfaces with a central upwardly projection, said upper surface lying above the box in which the bearing block is located, a cap with a concave and recessed under side adapted to rest upon said bearing block and overlap the top of the box containing said bearing block and to lift the platform when elevated, and means for simultaneously oscillating all of said cam shafts for elevating and supporting the platform.

2. A railway weighing scale including a platform, means for lifting said platform and supporting it above the scale bearings of the platform, a base on which said elevating means is mounted, said base consisting of a plurality of overlapping blocks triangular in cross section, and bolts extending longitudinally through said two plates for varying the relative positions so as to adjust the elevation of the means for elevating the platform.

In witness whereof, I have hereunto affixed my signature in the presence of the witnesses herein named.

MARLON H. WINSLOW.

Witnesses:
GEORGE M. MILLER,
CHAS. A. SMITH.